US006793950B1

United States Patent
Archibald et al.

(10) Patent No.: US 6,793,950 B1
(45) Date of Patent: Sep. 21, 2004

(54) PACKAGED FOOD ARTICLES WITH ENRICHED HEADSPACE

(75) Inventors: William E. Archibald, Maple Grove, MN (US); Jonathan W. Devries, Coon Rapids, MN (US); Donald P. Messer, Eden Prairie, MN (US); Ellen M. Silva, Minnetonka, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 09/464,779

(22) Filed: Dec. 17, 1999

(51) Int. Cl.[7] ............................................. B65D 81/20
(52) U.S. Cl. ...................... 426/130; 426/106; 426/128; 426/111; 426/118
(58) Field of Search ............................... 426/130, 118, 426/111, 106, 397, 410, 415, 418, 316, 128

(56) References Cited

U.S. PATENT DOCUMENTS

| | | | | |
|---|---|---|---|---|
| 2,391,354 A | * | 12/1945 | Slosberg | 426/131 |
| 2,753,268 A | * | 7/1956 | Ingle et al. | 426/410 |
| 2,882,169 A | * | 4/1959 | Kielsmeier et al. | 426/130 |
| 2,894,844 A | * | 7/1959 | Shakman | 426/118 |
| 2,955,045 A | * | 10/1960 | Coffey et al. | 426/410 |
| 2,967,777 A | * | 1/1961 | Grindrod | 426/410 |
| 3,105,765 A | * | 10/1963 | Creegan | 426/118 |
| 3,243,068 A | * | 3/1966 | Huston | 426/124 |
| 3,343,331 A | * | 9/1967 | French | 426/415 |
| 3,393,077 A | * | 7/1968 | Moreau | 426/410 |
| 3,734,276 A | * | 5/1973 | Bank | 426/124 |
| 3,840,680 A | * | 10/1974 | Schmidt et al. | 426/415 |
| 3,922,363 A | * | 11/1975 | Mitsuda et al. | 426/414 |
| 3,955,006 A | * | 5/1976 | Sokolsky et al. | 426/124 |
| 4,098,404 A | * | 7/1978 | Markert | 426/124 |
| 4,381,061 A | * | 4/1983 | Cerny et al. | 426/111 |
| 4,409,252 A | | 10/1983 | Buschkens et al. | |
| 4,542,029 A | * | 9/1985 | Caner et al. | 426/131 |
| 4,805,768 A | * | 2/1989 | Nishiguchi et al. | 426/118 |
| 4,923,702 A | * | 5/1990 | Powell et al. | 426/124 |
| 5,344,662 A | * | 9/1994 | Payne et al. | 426/124 |
| 5,428,943 A | * | 7/1995 | Balcombe | 426/111 |
| 5,731,023 A | * | 3/1998 | Milani | 426/410 |
| 5,804,237 A | * | 9/1998 | Diamond et al. | 426/111 |

FOREIGN PATENT DOCUMENTS

| | | |
|---|---|---|
| EP | 0636318 A | 2/1995 |
| EP | 0809939 A | 12/1997 |
| EP | 0812544 A | 12/1997 |
| EP | 0918020 A | 5/1999 |
| FR | 2585677 A | 2/1987 |
| GB | 1399094 A | 6/1975 |
| WO | WO 0020280 A | 4/2000 |
| WO | WO 0050305 A | 8/2000 |

\* cited by examiner

*Primary Examiner*—Steve Weinstein
(74) *Attorney, Agent, or Firm*—John A. O'Toole; Douglas J. Taylor; Everett G. Diederiks, Jr.

(57) ABSTRACT

A packaged food article of improved appearance and stackability comprises an unpressurized, imperforate container having an opening, wherein the container is fabricated from a material having a low gas permeability. A quantity of gas releasing food stuff, such as an active cultured dairy product, is disposed within and partially fills the container, while defining a headspace volume which is not filled with the food stuff. A peelable flexible seal membrane overlays and seals the opening. An initial headspace gas is enriched with the gas released from the food stuff, with the initial headspace gas being adapted to permeate the packaging material at a rate greater than both the rate in which gas is released from the food stuff within the container and the rate in which air permeates into the container, thereby avoiding outward bowing of the flexible seal during the shelf life of the packaged food article.

19 Claims, 3 Drawing Sheets

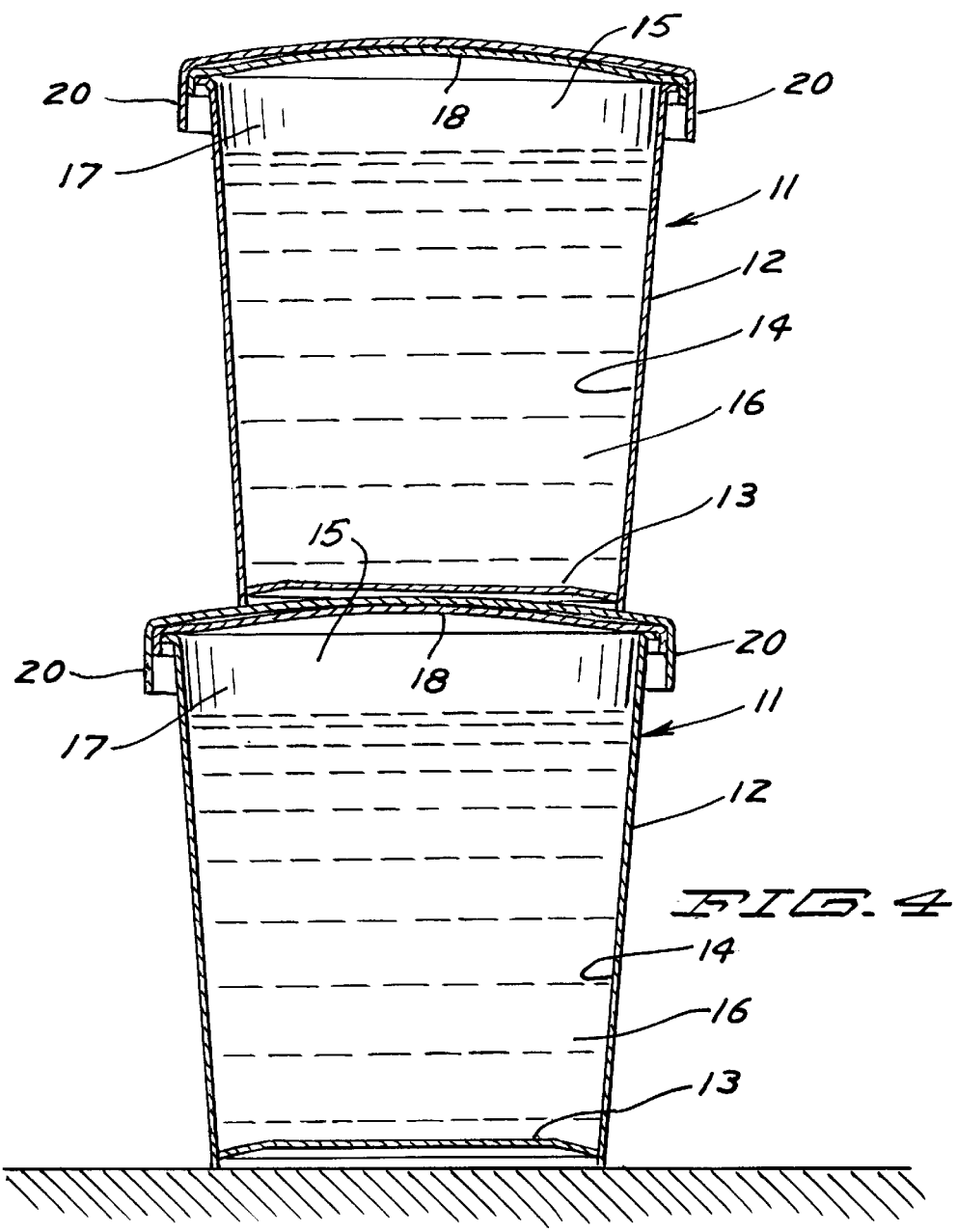
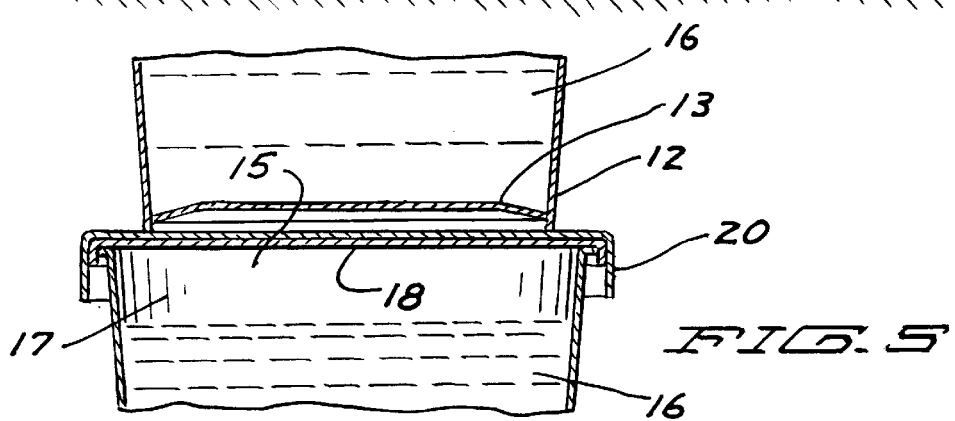

PACKAGED FOOD ARTICLES WITH ENRICHED HEADSPACE

FIELD OF THE INVENTION

The present invention relates to packaged food articles and to methods of their preparation. More particularly, the present invention relates to packaged cultured dairy product articles to their methods of preparation.

BACKGROUND OF THE INVENTION

The present invention provides further improvements in packaged food articles such as refrigerated cultured dairy product articles. A variety of cultured dairy products are packaged in relatively small, plastic containers. For example, refrigerated yogurt products can be packaged in single serving plastic containers. In certain products, the plastic containers generally include a plastic cup having an upper opening through which the yogurt is filled. After filling, the opening is sealed with an overlaying flexible membrane that seals the opening after filling. The plastic cups are designed to be stackable upon each other with the bottom of one cup resting upon the sealing membrane of a lower cup.

Certain foods continue to release gases into the headspace after filling. For example, certain vat cultured yogurt products evolve $CO_2$ gas after filling into the headspace. If the plastic container is fabricated having too low of a $CO_2$ flux through the container (i.e., lower than the rate of release from the food), then $CO_2$ can build up in the headspace. Even minor amounts of $CO_2$ build up in the headspace can cause the flexible seal membrane to undesirable bow upwards forming a bowed membrane having a convex shape. Such containers may be desirable for other reasons, e.g., due to lower cost of materials, even though possessing low particular gas flux properties.

A bowed or convex membrane is undesirable for at least two reasons. First, a bowed membrane aggravates stacking problems of containers upon each other. To conserve display space, at retail, yogurt containers are typically stacked at least two items high upon each other. Such stacking is usually done manually. Having an outwardly bowed membrane makes such manual stacking more difficult or even impossible. Also, even if stacked, such stacking arrangements are less stable and more prone towards collapse especially as the consumer selects a container from a stacked array. A second reason resides in consumers' perceptions and apprehensions regarding a bowed membrane. Consumers can erroneously believe that the bulging or bowing is caused by contamination or by some other product defect. Since yogurt products sell in highly competitive markets, even minor perceived imperfections can result in loss of sales.

One solution to minimize bowing is to package the food products under vacuum. By having a vacuum in the headspace, room is provided for the released gas. However, vacuum packaging is expensive, has slow packaging line speeds, and may not be practical for food products that are subject to damage when exposed to vacuum.

The present invention provides improvements in packaged foods that minimize the problems of bowing caused by such gas release without need for vacuum packaging. One advantage is that costs associated with such vacuum packaging can be avoided. A further advantage is that foods sensitive to vacuum can be packaged. Still another advantage is that foods containing live cultures such as cultured dairy products can be provided that comprise containers fabricated from low cost low $CO_2$ permeability materials. Still another advantage resides in minimization of the stacking problems associated with packages suffering from bowing.

Still another advantage of the present invention is that rather than merely preventing a bowed flexible membrane or even providing merely a flat flexible membrane, the present invention can provide a "dished" flexible membrane or inwardly curved. A dished membrane is one that is concave in shape. Such a shape desirably conveys to consumers an impression of having been vacuum sealed even though not so prepared. Moreover, the concave shape desirably suggests to consumers that seal integrity has been maintained.

Surprisingly, the present invention resides in the counter intuitive initial addition to the headspace prior to sealing of the very gas that is released by the contained food stuff. By adding higher concentrations of $CO_2$ initially to the headspace, flux or loss of $CO_2$ from the headspace through the container is initially accelerated by its higher concentration. Since air permeability into the container is slower than $CO_2$ loss, a partial vacuum is formed in the sealed headspace at least during the short time from production to sale. The partial vacuum provides volume for the evolved $CO_2$ without causing bowing. Indeed, enough vacuum is created to not only allow for the evolved gas but also to provide the desirable dishing membrane feature.

These and other advantages are described in the following description of an illustrative embodiment of this invention in connection with the drawings.

BRIEF DESCRIPTION OF THE DESCRIPTION OF THE DRAWINGS

FIG. 4 is a cross sectional view of articles not of the present invention similar to FIG. 2 depicting undesirable bowing of the closure membrane and deformed lid and shown in an unstable stacked arrangement.

FIG. 5 is a cross section of another embodiment of articles of the present invention similar to FIG. 3 comprising a cup shaped container with a resealing lid and an acceptable flat flexible membrane and a resealing lid shown in a stable stacked arrangement.

SUMMARY

In its product aspect, the present invention resides in packaged food articles of improved appearance and stackability such as a refrigerated active cultured dairy product. The articles comprise an unpressurized, imperforate container having an opening that is fabricated from a material having a low gas permeability, a quantity of gas releasing food stuff disposed within and partially filling the container defining a headspace such as a live cultured dairy; a peelable flexible seal membrane overlaying and sealing the opening; and an initial headspace gas that is enriched with the gas.

In its process aspect, tho present invention is directed to processes for preparing packaged food articles that are resistant to bowing of the flexible membrane by internally released gas. The process comprises the steps of:

providing an unpressurized, imperforate container having an opening fabricated from a material having a low gas permeability;

filling the container with a quantity of gas releasing foodstuff to partially fill the interior volume defining an unfilled headspace volume;

adding a quantity of the gas to the unfilled headspace volume of the container to form an initial gas enriched headspace; and, immediately thereafter sealing the container opening with a flexible seal membrane to form a packaged food article having an initial headspace enriched with a gas.

The headspace initial gas enriched headspace has all enriched gas content of about 15% to 40%.

DESCRIPTION OF THE PREFERRED EMBODIMENTS

The present invention relates to packaged food articles sealed with flexible membranes exhibiting reduced tendency to bowing and to their methods of preparation. Each of the article components as well as article use and attributes and methods of their preparation are described in detail below.

Throughout the specification and claims, percentages are by weight and temperatures in degrees Fahrenheit unless otherwise indicated.

Figures 1, 2:
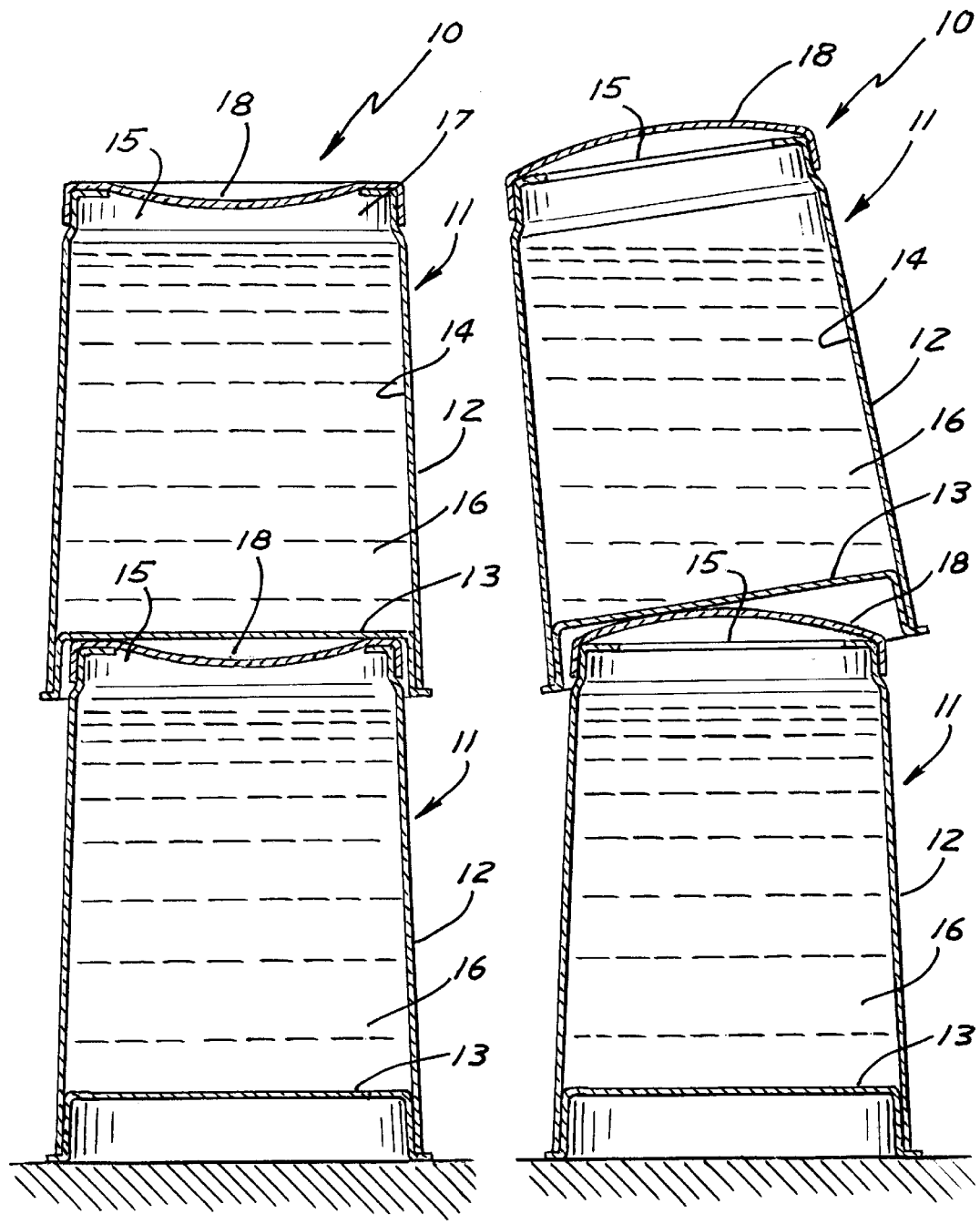
FIG. 1 is cross sectional view of one preferred embodiment of the articles of the present invention comprising an inverted cup shaped container having a preferred concave flexible seal membrane shown in a stable stacked arrangement.
FIG. 2 is a cross sectional view of articles not of the present invention depicting undesirable bowing of the closure membrane and shown an unstable stacked arrangement.

An improved article or packaged food product according to the preferred teachings of the present invention is shown in the drawings and is generally designated by reference numeral 10. In FIG. 1, two articles 10 are shown in a stable vertical stacked arrangement.

Article 10 includes a container 11 that can be of any suitable shape, size, and construction and generally defines an interior volume 14 and includes an upper opening 15. Container 11 is imperforate, adapted to hold fluid or moist foodstuffs 16, and is fabricated from a material that has a low but positive permeability to the gas being evolved or emitted from the foodstuff 16 (i.e., is not impermeable such as being constructed entirely of glass and/or metal). The low permeability can result from such factors as selection of the material used to fabricate the container, wall thickness, coatings or combinations of such features. The container 11 can be flexible, rigid or semi rigid, and of any suitable shape, size or configuration. In the preferred form, and as with existing designs, container 11 formed of semi rigid material such as plastic.

In preferred form, container 11 is of a shape and size to form a tub or small cup, whether or not inverted. In the preferred embodiment, the container 11 described herein and as depicted in FIG. 1 is an inverted two-part container having an upper main body portion 12 (FIG. 1) and a lower base portion 13 (FIG. 6) which is to be attached at the bottom of the main body portion 12 so as to form an open top 15 or opened top container for being filled with food products 16. By "inverted" is meant where the diameter of the upper opening 15 is smaller than the diameter of base portion 13. Also, while circular containers are depicted, other shaped containers having regular shapes such as squares or ovals or even complex or irregular shapes are contemplated. The preferred application is as a container for yogurt and the exemplary dimensions set forth herein for the container portions 10 and 12 are for a container that is filled with 170 g of flavored yogurt (having a density of about 1.05 g/cc) in a container having an internal total volume 14 of about 180 cc. However, it will be understood that the size of the container portions and the dimensions can be varied from that described herein and still fall within the scope of the present invention. The yogurt or other foodstuff 16 partially fills the interior volume of the container, e.g., about 75% to about 95% of the interior volume 14 of the container. The unfilled portion or fraction of the internal volume or head space 17 constitutes about 5% to 25% of the interior volume.

A good description of containers preferred for use herein is provided in U.S. Ser. No. 09/119,072 entitled "Plastic Container For Food Products" filed Jul. 10, 1993, now U.S. Pat. No. 6,213,301 issued Apr. 10, 2001, which is incorporated herein by reference. The articles therein described include two piece cup construction including an upper main body portion or piece ultrasonically welded to a bottom portion or piece. In a particular configuration the upper body piece is formed with inverted frustocanical plastic body. The container there described are preferably injection molded of polypropylene.

In the past, such yogurt containers have been fabricated of polystyrene. While expensive, polystyrene is desirably relatively permeable to $CO_2$ but relatively less permeable to oxygen. Certain yogurt products continue to generate $CO_2$ internally especially in the first several days. The high $CO_2$ gas permeability of polystyrene allows for escape of the $CO_2$ via diffusion through the container wall. Since polystyrene is relatively less permeably to oxygen, and nitrogen, the flux of $CO_2$ out of the container can be less than or equal to the flux of air into the container. As a result, $CO_2$ escapes so fast that $CO_2$ does not build up in the headspace sufficiently to cause the problem of membrane bowing. In contrast, the present containers are preferably fabricated from polypropylene primarily due to cost. Polypropylene is less expensive than polystyrene. Unfortunately, the $CO_2$ permeability of polypropylene is much less than polystyrene. As a result, articles fabricated from cups made from polypropylene are subject to the problems of bowing due to $CO_2$ buildup in the headspace.

Articles not of the present invention are depicted in FIGS. 2 and 4 which each show the stacking problems that can arise from bowing. The flexible membrane is depicted as having a unacceptable convex shape rather than the acceptable flat or preferred dished or concave shapes of the present invention. FIGS. 2 and 4 each show that arrays or stacks of stacked items with bowed membranes are unstable.

Figure 3:
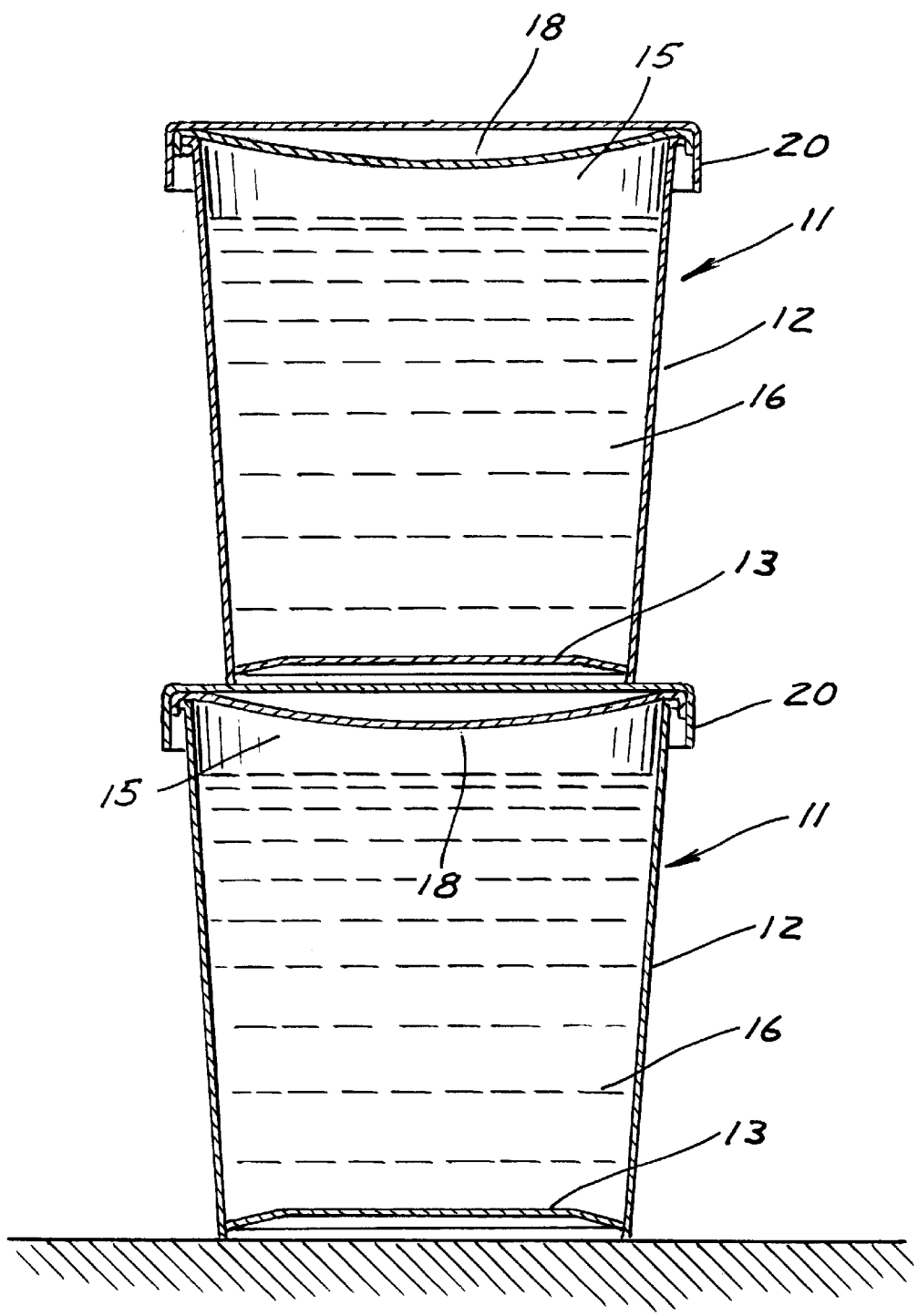
FIG. 3 is a cross section of another embodiment of articles of the present invention similar to FIG. 1 comprising a cup shaped container with a preferred convex flexible membrane and further including an overlaying resealing lid shown in a stable stacked arrangement.

Still other acceptable variations of the container are depicted in FIG. 3. In this variation, the container 11 is a conventional cup size and shape with opening of a larger diameter than that of its base. Container 11 can be one piece or can be a two piece construction. The article 10 can be seen to additionally comprise a conventional resealing lid 20 adapted to resealably engage with container 11. FIG. 3 further shows that lid 20 overlays seal membrane 18. In certain variations (not shown) lid 20 and membrane 18 are slightly spaced apart. Seal membrane 18 forms an inner seal. Such a lid 20 is especially useful for products wherein it is contemplated that only a portion will be used or consumed at least in some significant percentage of use occasions. It will be appreciated that any bowing of seal membrane problem caused by not following the present invention can be at least partially hidden by overlaying lid 20 if lid 20 is entirely opaque. Due to the spacing between the lid 20 (not shown) and the seal membrane 18 stacking problems can be mitigated. However, when the consumer removes the lid 20, the bowing of membrane can be nonetheless observed leading the consumer to erroneously question the quality of the product. In other variations, at least a portion of the resealing lid can be transparent and bowing can be observed.

Regardless of shape or construction, especially preferred for use herein are single serving sized containers, e.g., having an interior volume of about 150 to 300 cc.

The foodstuffs 16 are essentially characterized by being gas emitting. For example, certain yogurt products continue to evolve $CO_2$ gas for several days after filling. While not wishing to be bound by the proposed theory, it is speculated herein that the release of $CO_2$ results at least in part from $CO_2$ that is dissolved in milk or water used in preparation of yogurt. Also, naturally occurring carbonates in both milk and added water can react with the acidity of the yogurt to release further amounts of $CO_2$. The problem is particularly severe with vat cultured or stirred style yogurts. With such products, the yogurt is quiescently cultured in vats, cooled to refrigerated temperatures, filled in the containers at such refrigerated temperatures, and thereafter immediately sealed, and stored or maintained at refrigerated temperatures. In the preparation of set style yogurt, in contrast, a warm inoculated milk blend is charged to an open container and allowed to culture in situ at warm temperatures for extended times, e.g., for several hours in sealed containers. Thereafter, the yogurt is cooled to arrest the culturation. It is believed that in such methods of preparation, two factors help prevent bowing. First, the water vapor present in the headspace of the warm yogurt cups at time of sealing and during incubation condenses upon cooling, drawing a vacuum sufficient to prevent later doming. Second, the warm temperature increases the permeability of the cup to $CO_2$ so that any initial $CO_2$ released from the yogurt disperses quickly. The vacuum resulting from the condensation of water vapor and from the reduction in headspace gas volume upon cooling is sufficient to handle any further $CO_2$ gas resulting from dissolved $CO_2$ or interaction of acidity from the yogurt with any carbonate constituents. Also, any such chemical reaction is accelerated due to the warmer temperatures maintained to promote the culturing of the yogurt.

It is not believed that any significant amount of $CO_2$ results from the biological activity of the active yogurt culture. Thus, it is speculated that $CO_2$ generation can occur with any high moisture food product (i.e., higher than 50% moisture) especially those having a lower pH than 7. The problems are especially severe with even higher moisture products such as yogurt having moisture contents of greater than 80% in combination with a lower pH such as 4.0 to 5.5, especially 4.0 to 4.5.

By way of example, it is believed that a 170 g quantity of vat cultured yogurt in a sealed container maintained at refrigerator temperatures (0° C. to 10° C.) can generate up to 5 cc of $CO_2$ per day for the first several days.

Other cultured dairy products include, by way of example and not limitation, sour cream, kefir, and cottage cheese. The present invention is particularly suitable for use for yogurt especially vat cultured yogurt having a live (viable) lactobacillus for refrigerated distribution. In other variations, the food stuff can comprise farinaceous batters such as for the preparation of layer cakes and other baked goods. Such batters can comprise a chemical leavening system comprising a baking acid in the batter and an encapsulated baking soda. However, such protected leavening systems nonetheless continue to have some reaction between the leavening ingredients leading to evolution of $CO_2$ over time.

While the present invention find particular suitability for use in connection with moist foodstuffs that are $CO_2$ gas emitting, the present invention can find use for other products that emit other gases. Also, the present invention is directed towards foods that have low levels of dissolved or generated $CO_2$, e., g., 1 to 25% (v/v %), rather than to carbonated beverages which are characterized by high levels of carbonation, e.g. 100% to 800% $CO_2$ (v/v %).

The unfilled portion of the container inner volume 14 that is unfilled forms a headspace 17. Typically, the headspace has a volume that is about 5% to 25%, preferably about 10% to about 25% of the interior volume of the container.

The present articles further essentially comprise an initial headspace 17 enriched with the same gas in the headspace that is evolved or released by the foodstuff. By initial enriched headspace is meant a concentration profile immediately after sealing. For example, the native level of $CO_2$ in air is less than 0.1%. In preferred embodiments, the initial enriched headspace 17 immediately after sealing comprises about 10% (v/v) to 40% of $CO_2$, preferably about 20% to 30%.

The $CO_2$ enrichment can be conveniently provided by a small continuous stream of gaseous $CO_2$. Since $CO_2$ is heavier than air, the $CO_2$ displaces a portion of the air in the headspace volume. Higher levels of $CO_2$ are undesirable since the flux of $CO_2$ from the container can be so great as to pull so strong of a vacuum as to actually cause loss of seal integrity.

After being filled, the open top 15 is then sealed by a thin seal member 18 which can be adhered to the top of the main body portion 12 for sealing the food product in the interior 15 of the container.

It will be appreciated that eventually, the flux of $CO_2$ from the headspace of the container and the flux of air into the container will reach equilibrium with the atmosphere.

However, such equilibrium will be reached only long after expiration of the 45 to 70 day shelf life of refrigerated yogurt herein.

METHOD OF PREPARATION

In its process aspect, the present invention is directed to processes for preparing packaged food articles that are resistant to bowing of the flexible membrane by internally release gas. The process comprises a first step of providing an unpressurized, imperforate container having an opening fabricated from a material having a low gas permeability essentially as described above.

Thereafter, the present methods next farther essentially comprise the step of filling the container with a quantity of gas releasing food stuff to partially fill the interior volume defining an unfilled headspace volume. Conventional filling equipment and techniques can be practiced to perform this step. For example, stirred vat set chilled yogurt (having a temperature of 0° C. to 10° C., preferably about 5° C.) is pumped and added through the upper opening to partially fill the container. In the preferred variation, about 6 oz. (weight) is added to each 170 cc cup leaving about 30 cc of headspace.

The present methods still further essentially comprise the step of adding a quantity of the gas to the unfilled headspace volume of the container to form an initial gas enriched headspace. For example, for yogurt about 5 to 15 cc of clean pure $CO_2$ is added to the headspace by continuous gas stream. For example, the yogurt filled cups can be passed by a pipette that dispenses $CO_2$ gas. The heavier than air $CO_2$ tends to remain in the headspace until the sealing step. To reduce $CO_2$ usage, an intermittent $CO_2$ supply can be used that is timed to supply $CO_2$ at appropriate times and durations during the packaging cycle.

The methods then comprise the step of immediately thereafter sealing the container opening with a flexible seal membrane to form a packaged food article having an initial headspace enriched with a gas. The sealing is completed before all the enrichment gas has a chance to escape. Good results are obtained when the sealing step is commenced within 0.1 to 15 seconds after gas addition, preferably about 0.1 to 5 seconds after gas addition to the headspace. In more preferred variations the seal membrane is of a heat seal type rather than a pressure seal.

The headspace initial gas enriched headspace has an enriched gas content of about 15% to 40%, preferably, about 10% to 35%.

For those embodiments that further comprise a lid, the present methods can additionally comprise the step of applying a removable engaging resealing lid to overlay the flexible membrane.

In the preferred embodiment, the so formed packaged food items can then be stored at refrigeration temperatures 0° C. to 5° C. for distribution and sale. A flat or dished flexible membrane forms within about three days after filling and sealing and remains for the duration of its expected 50 day shelf life of the product with refrigeration temperature storage.

Due to the shape of the upper seal membrane, an advantage of the present invention is that the present articles are conveniently manually stackable in reasonably stable stacked arrays.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes, which come within the meaning and range of equivalency of the claims, are intended to be embraced therein.

What is claimed is:

1. A packaged food article of improved appearance and stackability, comprising:
    an imperforate container having a hollow interior, an interior volume and an opening, said container being fabricated from a packaging material having a low gas permeability;
    a quantity of gas releasing food stuff disposed within and partially filling the interior volume defining a headspace volume which is not filled with food stuff, said food stuff generating a quantity of a first type of gas when stored in the container and releasing the first type of gas into the headspace volume;
    a peelable flexible seal membrane overlaying and sealing the opening; and
    an initial headspace gas enriched with an additional quantity of the first type of gas supplied to the headspace volume from a source other than the food stuff to create an enriched headspace gas beneath the flexible seal membrane, said enriched headspace gas being capable of permeating through the packaging material at a rate greater than both the rate at which the fist type of gas is released from the food stuff within the container and the rate at which air permeates into the container such that the headspace volume can accommodate the food generated first type of gas sufficient to avoid potential outward bowing of the flexible seal membrane during the shelf life of the packaged food article.

2. The packaged food article of claim 1, wherein the first type of gas is $CO_2$.

3. The packaged food article in claim 2, wherein at least a portion of the $CO_2$ is dissolved $CO_2$, carbonates, and mixtures thereof.

4. The packaged food article in claim 2, wherein the packaging material is polypropylene.

5. The packaged food article in claim 2, wherein the flexible sea membrane is fabricated from an impermeable foil laminate.

6. The packaged food article in claim 2, wherein the container has a total volume of about 150 to 300 cc.

7. The packaged food article in claim 6, wherein the flexible seal membrane has a concave shape.

8. The packaged food article in claim 7, wherein the food stuff is refrigerated to a temperate of about 0° C. to about 10° C.

9. The packaged food article in claim, wherein the headspace volume comprises about 5% to 25% of the container's total volume.

10. The packaged food article in claim 1, wherein the food staff has a moisture content of at least 50%, said moisture content being a source of $CO_2$.

11. The packaged food article in claim 1, wherein at least a portion of the food stuff is provided by milk.

12. The packaged food article in claim 1, wherein the food stuff has a pH of less than 7.

13. The packaged food article in claim 1, wherein the foodstuff is a refrigerated cultured dairy product.

14. The packaged food article in claim 13, wherein the cultured dairy product is yogurt.

15. The packaged food article in claim 14, wherein the yogurt comprises a vat set yogurt having viable lactobacillus culture.

16. The packaged food article in claim 13, wherein the headspace volume comprises about 10% to 25% of the container's total volume.

17. The packaged food article in claim 16, wherein the initial head space gas comprises about 20% to 40% $CO_2$ (v/v).

18. The packaged food article in claim 1, additionally comprising: a removable lid overlaying the seal membrane.

19. A packaged food article of improved appearance and stackability, comprising:

an imperforate container having a hollow interior, an interior volume and an opening leading to the hollow interior;

a quantity of gas releasing food stuff disposed within and partially filling the interior volume defining a headspace volume which is not filled with food stuff, said food stuff generating a quantity of a first type of gas when stored in the container and releasing the first type of gas into the headspace volume;

a peelable, flexible seal membrane overlaying and sealing the opening; and an initial headspace gas enriched with an additional quantity of the first type of gas supplied to the headspace volume from a source other than the food stuff to create an enriched headspace gas beneath the flexible seal membrane, wherein the enriched headspace gas is capable of permeating through the packaging material at a rate greater than both the rate at which the first type of gas is released from the food stuff within the container and the rate at which air permeates into the container, such that the headspace volume can accommodate the food generated first type of gas sufficient to avoid potential outward bowing of the flexible seal membrane during the shelf life of the packaged food article.

* * * * *